United States Patent [19]
Nishimura

[11] Patent Number: 5,702,169
[45] Date of Patent: Dec. 30, 1997

[54] FILM VIEWER FOR FILM HAVING MAGNETIC LAYER

[75] Inventor: Toru Nishimura, Asaka, Japan

[73] Assignee: Fuji Photo Film Co., Ltd., Kanagawa, Japan

[21] Appl. No.: 560,291

[22] Filed: Nov. 17, 1995

[30] Foreign Application Priority Data

Nov. 18, 1994 [JP] Japan ................ 6-285058

[51] Int. Cl.⁶ ........................... G03B 21/43
[52] U.S. Cl. .............. 353/25; 353/26 A; 353/DIG. 2
[58] Field of Search ............. 353/25, 268, 26 A, 353/DIG. 2

[56] References Cited

U.S. PATENT DOCUMENTS

| | | | |
|---|---|---|---|
| 5,164,574 | 11/1992 | Ujiie et al. | 353/26 A |
| 5,272,352 | 12/1993 | Maetani et al. | 353/26 A |
| 5,424,790 | 6/1995 | Tsunefuji et al. | 353/26 A |
| 5,521,662 | 5/1996 | Suzuki | 353/25 A |
| 5,532,773 | 7/1996 | Shaw et al. | 353/26 A |

FOREIGN PATENT DOCUMENTS 7219038  8/1995  Japan.

*Primary Examiner*—William Dowling

[57] ABSTRACT

When a film cartridge storing a developed film including a magnetic layer is mounted in an electronic viewer, the film is pulled out from the cartridge, and a forward end of the film is wound around a winding axis. A film transport is controlled in accordance with a detection signal generated by a frame detector every detection of the frame, so that a film image of the film can be observed. At the same time, the viewer reads out magnetic information recorded in the magnetic layer, which corresponds to each film image. Contents of the magnetic information are displayed on an LCD of the viewer. As a result, a user can observe his desirable film image and the contents of the magnetic information corresponding the desired film image.

8 Claims, 16 Drawing Sheets

FIG.6(A)

DATE: 95.11.28　03:15　SIZE: P

SHUTTER: 1/250　APERTURE F=5.6 STROBE=OFF

FIG.6(B)

FILM TITLE: A WEDDING ANNIVERSARY

FRAME TITLE: CONGRATULATIONS MOM & DAD/

FIG.12

| FRAME NUM | DATE | TIME | | |
|---|---|---|---|---|
| 4 0 | 8 9 5 , 0 6 , 3 0 | 1 0 : 2 3 | A | M | COMMON |
| H | 9 9 | 1 / 8 0 0 | | 1 . 3 | 5 | INDIV |
| TYPE | SHUTTER | | APERTURE | |

FIG.13(A) (FREE TITLE) FRAME NUM. — TYPE: F, COMMON/INDIV., DATE, TIME, SHUTTER, APERTURE

FIG.13(B) (SELECTED TITLE) FRAME NUM. — TYPE: S, COMMON/INDIV., DATE, TIME, SHUTTER, APERTURE

FIG.14(A)

| FRAME NUM. | | | | DATE | | | | | TIME | | | | APERTURE |
|---|---|---|---|---|---|---|---|---|---|---|---|---|---|
| | 2 | 0 | | — | — | . | — | — | . | — | — | : | — | — | COMMON |
| | | — | | — | / | — | — | — | — | — | | — | — | INDIV. |
| TYPE | | | | | | SHUTTER | | | | | | | |

FIG.14(B)

| FRAME NUM. | | | | DATE | | | | | TIME | | | | APERTURE |
|---|---|---|---|---|---|---|---|---|---|---|---|---|---|
| F | : | H | A | P | P | Y | B | I | R | T | H | D | A | Y | COMMON |
| | N | O | T | R | E | A | D | A | B | L | E | | | INDIV. |
| TYPE | | | | | | SHUTTER | | | | | | | |

FIG.15

| F | |
| : | |
| N | H |
| O | A |
| T | P |
| | P |
| R | Y |
| E | |
| A | B |
| D | I |
| A | R |
| B | T |
| L | H |
| E | D |
| | A |
| | Y |
| | |
| | |
| | |
| | |
| | |

| FRAME NUM. | DATE | TIME | | | COMMON |
|---|---|---|---|---|---|
| | N O T | D E V E L O P E D | | S140 | |
| | | | | | INDIV. |
| TYPE | SHUTTER | | APERTURE | | |

FIG.17

| FRAME NUM. | DATE | TIME | | | COMMON |
|---|---|---|---|---|---|
| 2 0 | T R A N S P O R T | E R R O R | | | |
| | | | | | INDIV. |
| TYPE | SHUTTER | | APERTURE | | |

FILM VIEWER FOR FILM HAVING MAGNETIC LAYER

BACKGROUND OF THE INVENTION

1. Field of the Invention

The present invention relates to a film viewer which pulls out a film from the film cartridge so that a film image on the film can be observed. More particulary it relates to a film viewer for a film having a magnetic layer thereon.

2. Description of the Related Art

Up to this time, the developed photographic film was returned to an user in such a manner that the film is stored in the negative cover, so the user was able to see a film image on the film through the negative cover which is transparent when he orders additional prints.

Recently, there is a method for returning a film to the user. In the method, the film is not divided but is stored in a film cartridge and the user receives the film cartridge together with prints at a development agency. The user can not pull out the film from the film cartridge, therefore, he can not see the film image for ordering additional prints in this method.

The Japanese Patent Application Laid Open No. 7-219038 disclosed a film viewer which pulls out the film from the film cartridge so that the film image can be observed. A knob is provided with the film viewer of the Japanese Patent Application Laid Open No. 7-219038. The user mounts the film cartridge in the main body, and rotates a knob with his fingers so as to pull out the film. As a result, a spool of the film cartridge is rotated by means of a gear line connected to the knob and the film is pulled out from the film cartridge. The film image is sequentially pulled out from the film cartridge so as to be observed through a window which is provided in the viewer main body. The pulled-out film is wound around a winding axis which is linked with the knob. After the observation, the knob is reversely rotated and the spool is rotated in the reverse direction, so that the film is stored in the film cartridge.

Moreover, the film cartridge includes an indicating part which indicates whether the film has been developed or not. A preventing part is provided in the film viewer. The preventing part prevents the film cartridge from being mounted when an indicating part indicates that the film has not been developed.

Recently, a photographic film having a magnetic layer for each frame is proposed. Information relating to date/time of photographing, a photographing size, a shutter speed, a f-number, a strobe ON/OFF, a film title, a frame title, and the like is magnetically recorded in the magnetic layer at the time of photographing.

However, there is a problem in that the conventional film viewer is not capable of reading out the information recorded in the magnetic layer and displaying contents of the information.

SUMMARY OF THE INVENTION

The present invention has been developed in view of the above-described circumstances. One object of the present application is to provide a film viewer which enables an user to observe a film image on the film having a magnetic layer, and which is capable of displaying contents of magnetic information recorded in the magnetic layer.

To achieve the above-mentioned objects, a film viewer of the present invention for a film having a plurality of frames and a magnetic layer comprises a storage part, a film supplying means, film winding means, a window for an observation of an image on the frame, frame detection means, reading means, display means, and control means.

The storage part stores a film cartridge which is mounted in the storage part. The film cartridge stores the film which has been developed. The film supplying means is provided for supplying the film. The film supplying means includes a rotational axis which is engaged with a spool of the film cartridge and rotated by a motor. The film winding means is provided for winding the film. The film winding means includes a winding axis which is rotated by a motor so as to wind the film. The window is used to observe an image on the frame being positioned between the film supplying means and the film winding means. The frame detection means is provided for detecting each frame of the film. The frame detection means generates a detection signal every detection of the frame. The reading means is provided for reading out magnetic information which is recorded in the magnetic layer of the film. The display means is provided for displaying contents of the read-out magnetic information. The control means controls the film supplying means and/or the film winding means to transport the film in such a manner that an image of each frame can be observed through the window in accordance with the detection signal of the frame detection means. Also, the control means controls the display means to display the magnetic information corresponding to the image to be observed through the window.

According to the present invention, after the film cartridge is mounted in the viewer main body, the control part controls the film supplying means and/or the film winding means so that the film is pulled out from the cartridge, and a forward end of the film is wound around a winding axis. Then, a film transport is controlled in accordance with a detection signal generated by the frame detection means every detection of the frame. As a result, the film image of the film can be observed through the window. At the same time, the viewer reads out magnetic information recorded in the magnetic layer, which is corresponding to each film image. Contents of the magnetic information is displayed on the display means of the viewer. Moreover, it is possible to read out all of the magnetic information at the start of the film transport. As a result a user can observe his desirable film image and the contents of the magnetic information corresponding the desired film image.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures and wherein:

FIG. 6 (A) and FIG. 6 (B) are explanatory views illustrating contents of magnetic information displayed on an LCD.

FIG. 12 is a plan view illustrating contents of information displayed on the LCD of the film viewer shown in FIG. 9;

FIG. 13 (A) and FIG. 13 (B) are plan views illustrating contents of information displayed on the LCD of the film viewer shown in FIG. 9;

FIGS. 14 (A) and FIG. 14 (B) are plan views illustrating contents of information displayed on the LCD of the film viewer shown in FIG. 9;

FIG. 15 is a plan view illustrating contents of information displayed on the LCD of the film viewer shown in FIG. 9;

FIG. 16 is a plan view illustrating contents of information displayed on the LCD of the film viewer shown in FIG. 9; and FIG. 17 is a plan view illustrating contents of information displayed on the LCD of the film viewer shown in FIG. 9.

DESCRIPTION OF THE PREFERRED EMBODIMENT

Detailed description will hereunder be given of the preferred embodiment of a film viewer for a film having a magnetic layer thereon according to the present invention with reference to the accompanying drawings.

Figure 1:
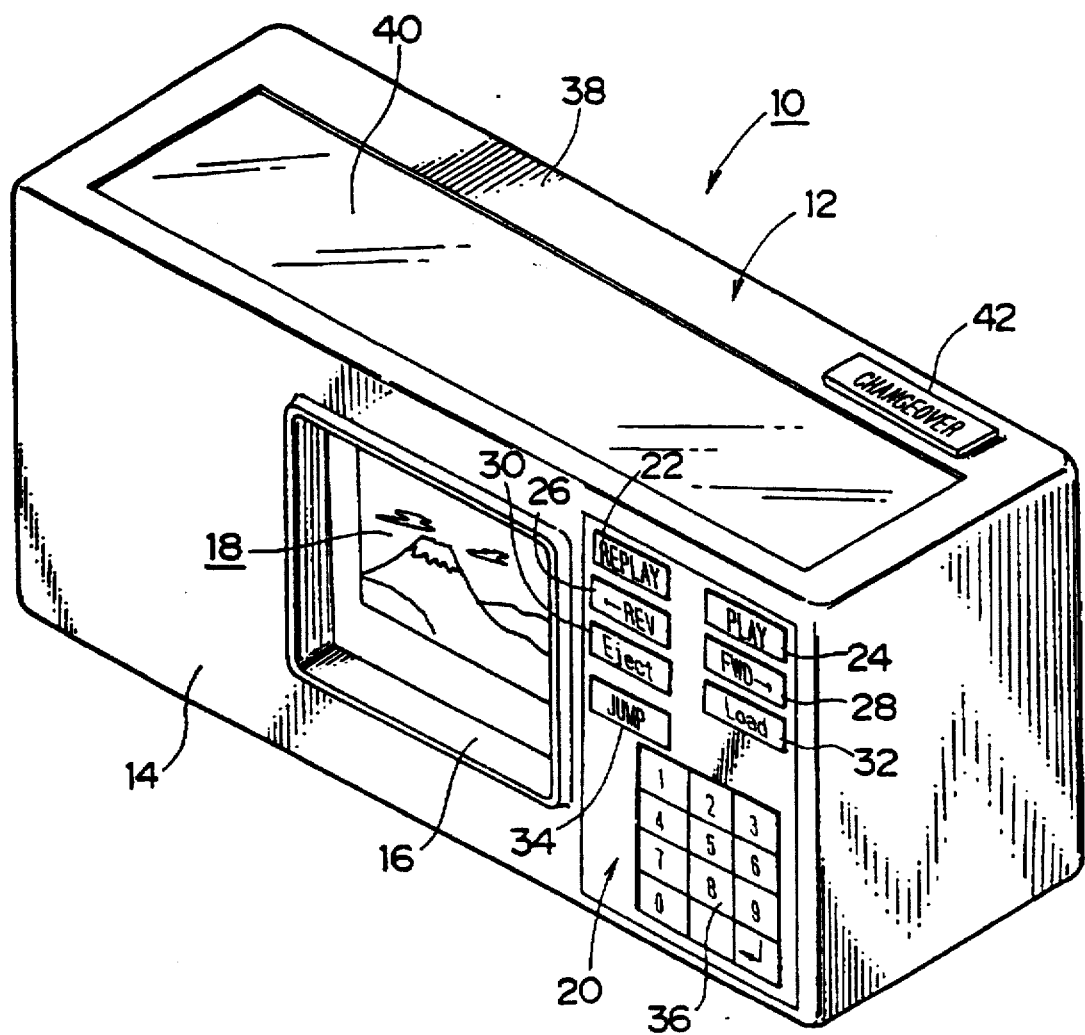
FIG. 1 is a perspective view illustrating an external appearance of a film viewer for a film having a magnetic layer according to the present invention.

FIG. 1 is a perspective view illustrating an external appearance of a film viewer according to the present invention. A main body 12 of the film viewer 10 has a rectangular-parallelepiped shape.

A rectangular window 16 is opened in a central part of a front surface 14 of the main body 12. Later-described frame 18 and optical indication 19 can be observed through the window 16. A key panel 20 is provided on the right side of the window 16 in the drawing. The key panel 20 comprises a REPLAY button 22 for instructing to transport the film by one frame in a reverse direction, a PLAY button 24 for instructing to transport the film by one frame in forward direction, a REV button 26 for instructing to sequentially transport the film in the reverse direction, a FWD button 28 for instructing to sequentially transport the film in the forward direction, an EJECT button 30 for the film cartridge, a LOAD button 32 for instructing a film-loading, a JUMP button 34 for displaying a frame of which a frame number is instructed and a ten-key 36 including buttons 0–9 for instructing the frame number of a film image to be observed after the JUMP button 34 is pushed down.

A rectangular liquid crystal display (hereinafter referred to as a LCD) 40 is provided in a top surface 38 of the main body 12. Magnetic information recorded in a magnetic layer of the film is displayed on the LCD 40. The displayed magnetic information can be changed by pushing down a CHANGEOVER button 42 which is provided at a right corner of the top surface 38. The magnetic information will be described later.

Figure 2:
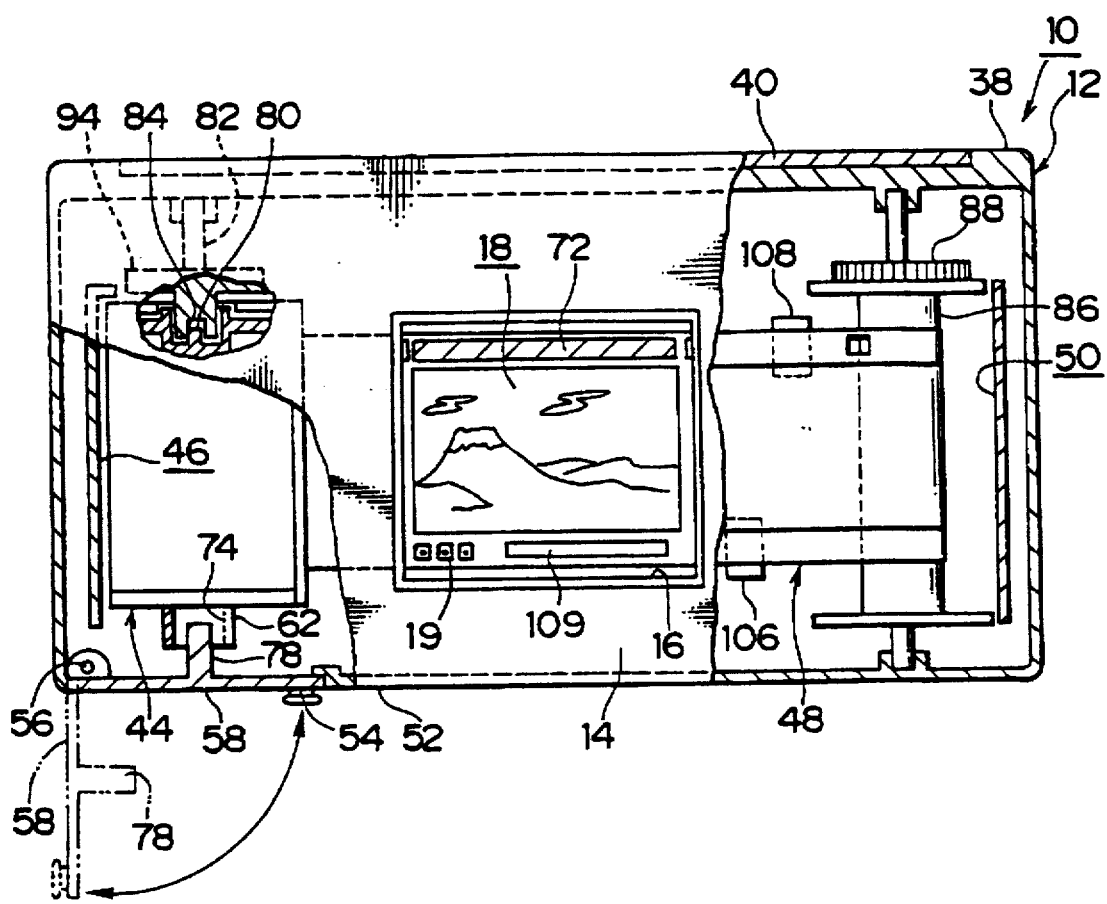
FIG. 2 is an elevation of the film viewer shown in FIG. 1 including a partially cutaway view.

As shown in FIG. 2, a storage part 46 for the film cartridge 44 is formed on the left side of the window in the main body 12. The film is pulled out from the film cartridge 44 which is stored in the storage part 46. A winding part 50 for the film 48 is formed on the right side in the drawing.

An opening is formed on the bottom surface of the storage part 46. A bottom lid 58 is provided over the opening 54, which is capable of being opened and closed by hinges 56. The film cartridge 44 is taken in and out through the opening 54.

Figure 3:
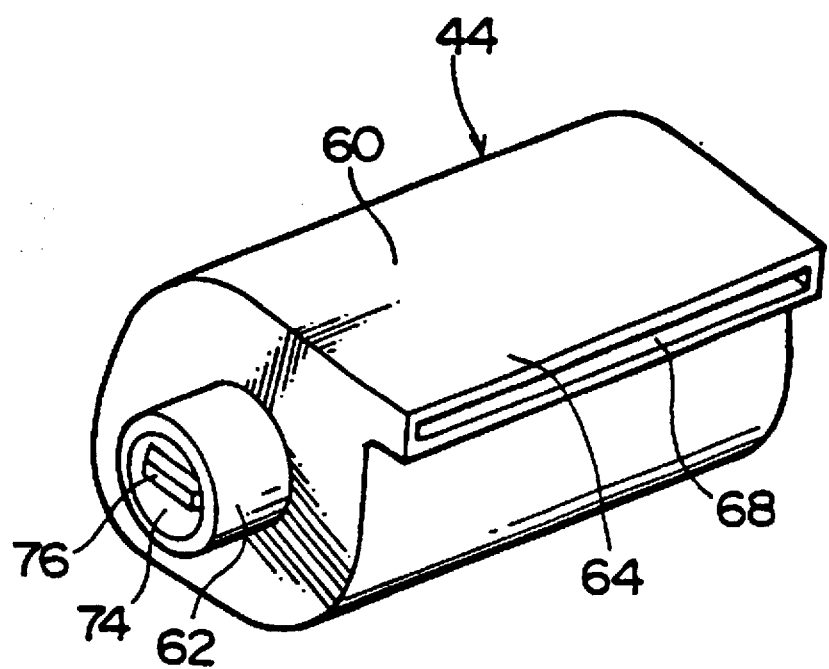
FIG. 3 is a perspective view illustrating a film cartridge applied to the film viewer.

FIG. 3 describes the film cartridge 44 which is stored in the storage part 46. The film cartridge 44 mainly comprised a body 60, a spool 62, a light-shielding member 64, and the like, and all members are made of plastic. The film 48 (see FIG. 4) is completely wound within the film cartridge 44 around the spool 62. In order to sent out the film 48 from the film cartridge 44, the spool 62 is rotated so that the film 48 comes out through an slit 68.

Figure 4:
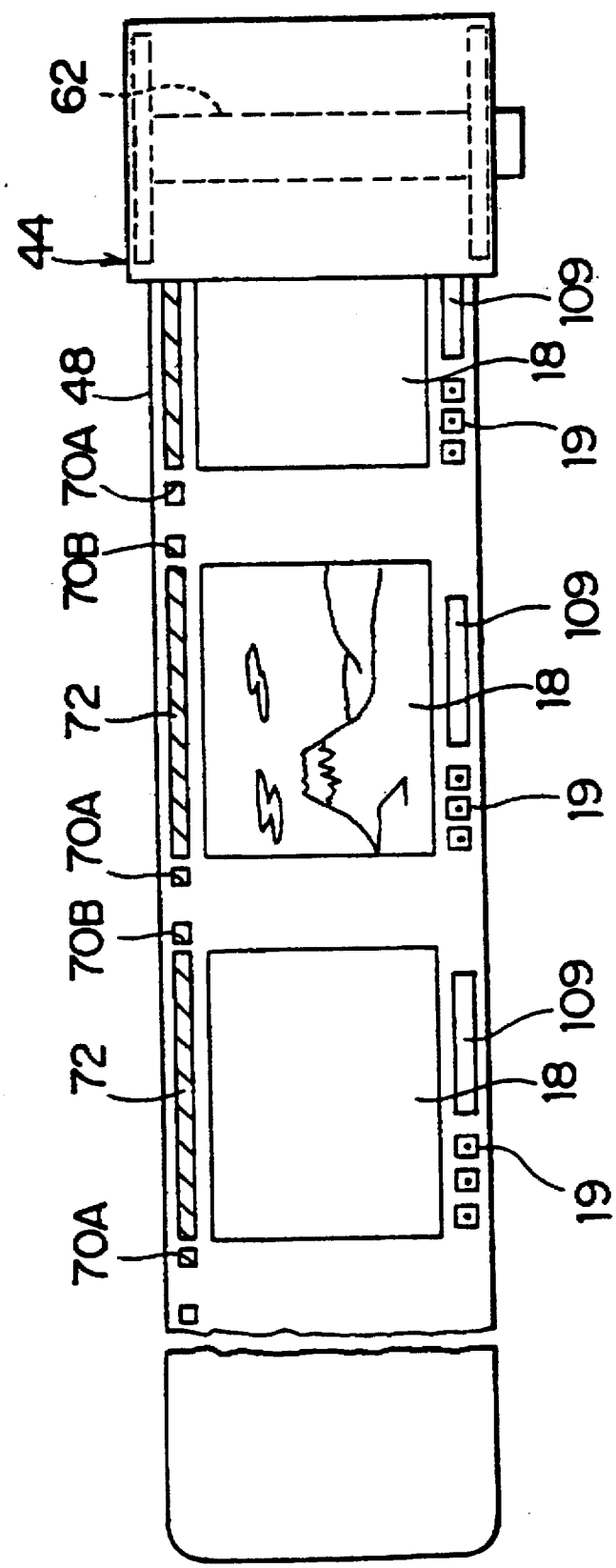
FIG. 4 is an explanatory view of a film stored in the film cartridge.

As shown in FIG. 4, a front perforation 70A and a rear perforation 70B are provided for each frame 18 in an upper edge of the film 48 along a longitudinal direction of the film. The front perforation indicates a front edge of the frame 18 and a rear perforation 70B indicates a rear edge of the frame 18. A magnetic layer 72 is formed between the front perforations 70A and the rear perforation 70B. Magnetic information is recorded in the magnetic layer 72 at the time of photographing. The magnetic information relates to the date/time of photographing, the photographing size which indicates a conventional size, a panoramic size, or a high-vision size, the shutter speed, the f-number, the strobe ON/Off, the film title, the frame title, and the like.

Three optical indications 19 are provided for each frame 18 in a lower edge of the film. The optical indications 19 are exposed in accordance with a photographing size which is set at the time of photographing. That is, ff only the left optical indication 19 is exposed, the photographing is performed in the high-vision size, if the left and the central optical indications are exposed, the photographing is performed in the panoramic size, and ff the all of the optical indications 19 are exposed, the photographing is performed in the conventional size. The user looks at the optical indications 19 through the window 16 with his eyes.

As shown in FIG. 3, a indication piece 76 is provided in a concave part 74 of the spool 62. The indication piece 76 indicates whether the film 48 in the film cartridge 44 has been developed or not. If the film has been developed, the indication piece 76 is taken out by a laboratory, etc. and is returned to the user. A projection 78 is provided inside the bottom lid 58 in order to detect whether there is the indication piece 76 or not. When the bottom lid 58 is dosed, the projection 78 is inserted into the concave part 74 of the spool 62. Accordingly, when the film cartridge 44 which has not been developed is mounted by mistake, the bottom lid 58 cannot be dosed because the projection 78 touches the indication piece 76. As a result, even if the user mounts the film cartridge of which film has not been exposed, the film can be prevent from being exposed.

A rib 80 is formed in the end of the spool 62 which does not includes the indication piece 76 as shown in FIG. 2. The rib 80 is engaged with a slit 84 of a rotational axis 82 when the film cartridge 44 is loaded, so that a rotational force is transmitted from the rotational axis 82 to the spool 62. As a result, the spool 62 is rotated, and the film 48 is pulled out from the film cartridge 44, and also wound into the cartridge.

A winding axis 86 is provided in the winding part 50. A top end and a bottom end of the winding axis 86 are supported by the main body 12 in such a manner to be capable of rotating. A gear 88 is secured to the upper part of the winding axis 86, and the gear 88 is connected to the motor 92 via a crutch 90 in FIG. 5. The gear 88 slips to the rotation of the motor 92 by a function of the crutch 90 when torque applied to the gear 88 (that is, wind-up torque of the film 48) exceeds a predetermined torque. Therefore, the film 48 can be wound up around the winding axis at a fixed speed. The driving force of the motor 92 is transmitted to a gear 94 (see FIG. 2) of the rotational axis 82 by a gear mechanism which is not shown in the drawing.

The spool 62 is rotated by the gear mechanism in order to send out the film 48 from the film cartridge 44. The gear mechanism transmits the driving force to the rotational axis 82 until the forward end of the film 48 is wound around the winding axis 86. After this, the driving force is transmitted to the winding axis 86 only. At the time of rewinding the film 48 into the film cartridge 44, the gear mechanism transmits the driving force to the rotational axis 82 only.

Figure 5:
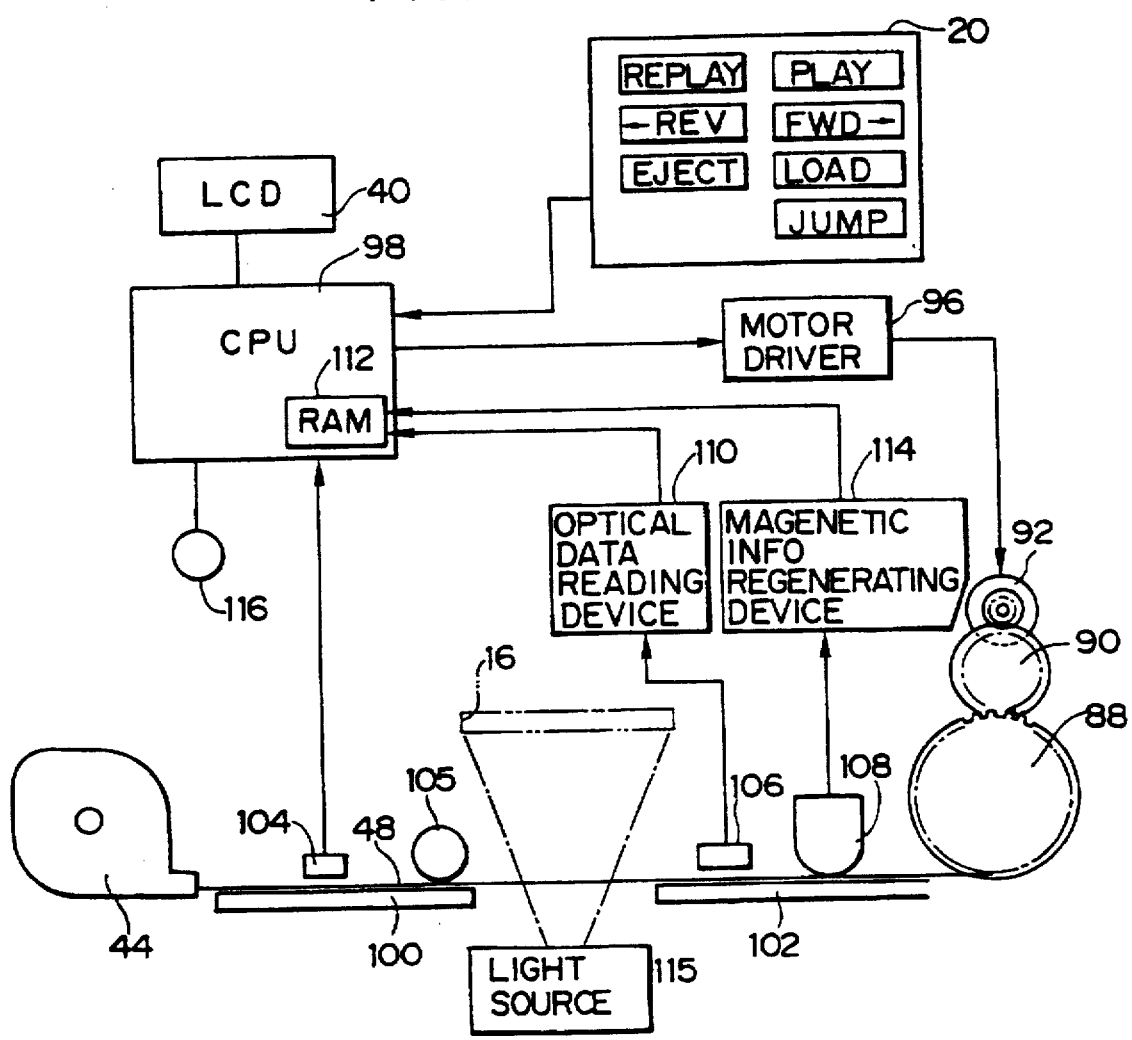
FIG. 5 is a block diagram illustrating the film viewer.

The motor 92 is driven in accordance with an instruction from a motor driver 96 of FIG. 5. A CPU 98 (Central Processing Unit) is provided in the main body 12 in order to control the motor driver 96. The motor driver 96 receives an instruction as for a rotational direction and a rotational speed of the motor 92 and outputs them to the motor 92.

When the user operates one of the buttons 22 through 42 of the key panel 20 in FIGS. 1 and 5, an instruction signal corresponding to each operation is transmitted to the CPU 98. The CPU 98 controls the motor driver 96 when it receives the instruction signal, so that the motor 92 drives in accordance with the instruction signal.

The film 48 is pulled out from the film cartridge 44 and is transported along a guide plate 100 as shown in FIG. 5. The film 48 passes below the window 16. Then, the film 48 is wound up around the winding axis 86 along the guide plate 102. A perforation sensor 104 is provided above the guide plate 100. The perforation sensor 104 detects the front perforation 70A (see FIG. 4) and the rear perforation 70B (see FIG. 4) for every time the frame 18 passes, and sends a H-level detection signal to the CPU 98 every detection of the perforations. In this embodiment, when the perforation sensor 104 detects one front perforation 70A, a frame which is arranged in front of the detected perforation 70A is positioned just below the window 16. A capstan roller 105 is arranged in a vicinity of the perforation sensor 104. The driving force is transmitted to the capstan roller 105 from the motor 92, and the film 48 pulled out from the film cartridge 44 is transported at a fixed speed by a rotational force of the capstan roller 105.

An optical sensor 106 and a magnetic head 108 are provided side by side above the guide plate 102. The optical sensor 106 reads out the information relating to the photographing size from the optical indication 109. When the optical data 109 such as a bar code, etc. indicating frame numbers are recorded, the optical data 109 is also read out by the optical sensor 106. The optical data is regenerated by the optical data reading device and is memorized in the RAM 112 of the CPU 98. The magnetic head 108 reads out the magnetic information recorded in the magnetic layer 72 of the film 48. The read-out magnetic information is treated by a magnetic information regeneration device 114 and stored in the RAM 112 of the CPU 98.

A light source 115 is provided between the guide plates 100 and 102 in such a manner to illuminate an image on the frame 18 positioned below the window 16 from back. The electronic viewer 10 is provided with an alarm 116 which is controlled by the CPU 98. The alarm 16 makes an electronic sound when the film 48 is completely rewound into the film cartridge 44, and when the film 48 is incorrectly transported, and the like.

The information stored in the RAM 112 is read out by the CPU 98, and is displayed on the LCD 40 as shown in FIG. 6. For example, DATE and TIME (the date and time of photographing), SIZE (photographing size), SHUTTER (shutter speed), APERTURE (F value), STROBE (strobe ON/OFF) are displayed on the LCD 40 of FIG. 6 (A). Film title and Frame title are displayed on the LCD 40 of FIG. 6 (B). The displayed information can be changed over by a CHANGEOVER button 42 (see FIG. 1).

Figure 7:
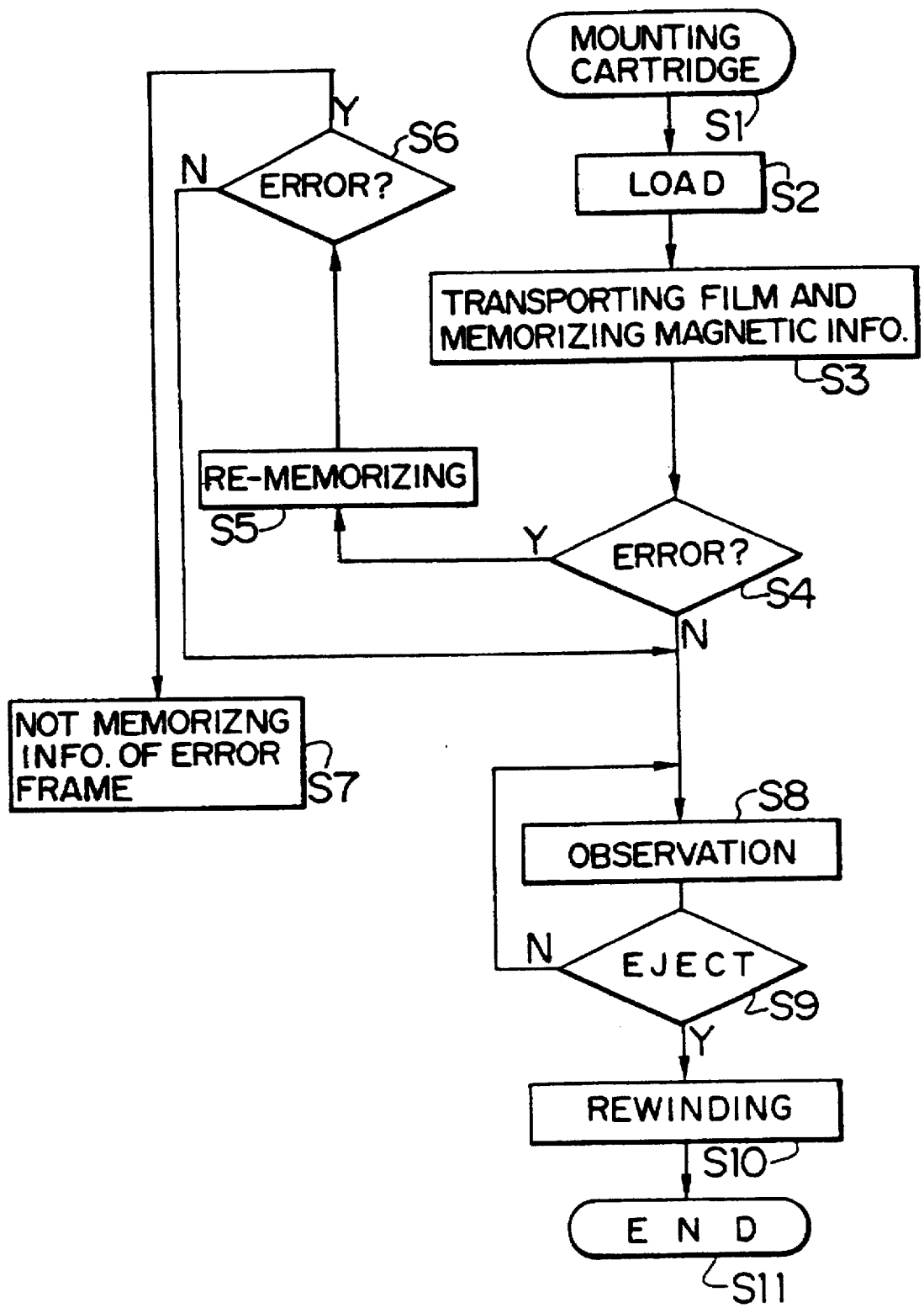
FIG. 7 is a flow chart illustrating an operation of a film viewer.

Next, an explanation will hereunder be given of how to use the film viewer 10 which is constructed in the above-mentioned manner with reference to a flow chart in FIG. 7.

First, the film cartridge 44 is mounted in the main body 12 (S1).

Next, the LOAD button 32 of the key panel 20 is pushed down (S2) so as to start a film loading. The film 48 is pulled out from the film cartridge 44 and is wound up around the winding axis 86. At the time of winding, the magnetic information recorded in the magnetic layer 72 of the film 48 is read by the magnetic head 108, and the read-out information is memorized in RAM 112 for each frame (S3). In the case that optical data is recorded on the film 44, the optical data is read by an optical sensor 106 in order to be memorized in the RAM 112. After the completion of the winding, the motor 92 is reversely driven so that the film 48 is rewound into the film cartridge 44. At the time of rewinding, it is previously judged whether or not there was an error in reading out the magnetic information from whole of magnetic layer 72 (S4). If there was the error, the reading is carried out again during the rewinding (S5). After the completion of rewinding the film 48, it is judged whether the error has been eliminated or not (S6). Regarding the magnetic layer 72 from which the magnetic information was not correctly read out, the magnetic information is judged as an error information so that it is not memorized (S7).

Next, the user operates the key panel 20 so as to start an observation of the film image (S8). For example, the PLAY button 24 is pushed, the CPU 98 instructs to start pulling out the film 48, so that the motor 92 is driven. When the CPU 98 receives the detection signal of the perforation sensor 104 which indicates a detection of a second front perforation 70A (a front perforation of the second frame 18), it instructs the motor 92 to stop. As a result, an image on the first frame (frame number 1) is positioned below the window 16, so that the user can observe the image of the first frame. At the same time, the magnetic information for the first frame is read out from the RAM 112, and contents of the magnetic information are displayed on the LCD 40. The user pushes down the PLAY button 24 after every observation, so that the film images can be observed sequentially from the first frame to a last frame. Moreover, it is possible to observe the contents of the magnetic information which corresponds to the image being observed through the window 16 on the LCD 40.

Furthermore, when the user pushes down the JUMP button 34 and inputs a frame number of the his desirable image with the ten-key 36, the CPU 98 controls the motor 92 to transport the desired film up to the window 16. Also, the CPU reads out the magnetic information corresponding to the desired film image from the RAM 112 and instructs display of the information on the LCD 40. As a result, the user's desirable film image and its magnetic information can be observed at the same time.

After the observation, the user pushed down the EJECT button 30 so as to take out the film cartridge 44 from the storage part 46 of the main body 12 (S9). When the EJECT button 30 is pushed down, the CPU 98 instructs to rewind the film 48 into the film cartridge 44 completely, so that the motor 92 is reversely driven (S10). After the completion of rewinding is confirmed by an alarm 116, a bottom lid 58 is opened and the cartridge 44 is taken out. As a result, the observation of the film 48 of one film cartridge 44 is completed (S11).

In this embodiment, the film 48 is transported by the driving force of the motor 92, and the crutch 90 is provided in order to keep a tension applied to the film 48 constant. As a result, the film viewer of the present invention can prevent a damage of the film compared with the conventional film viewer in which the tension changes because the film is manually transported.

Figure 8:
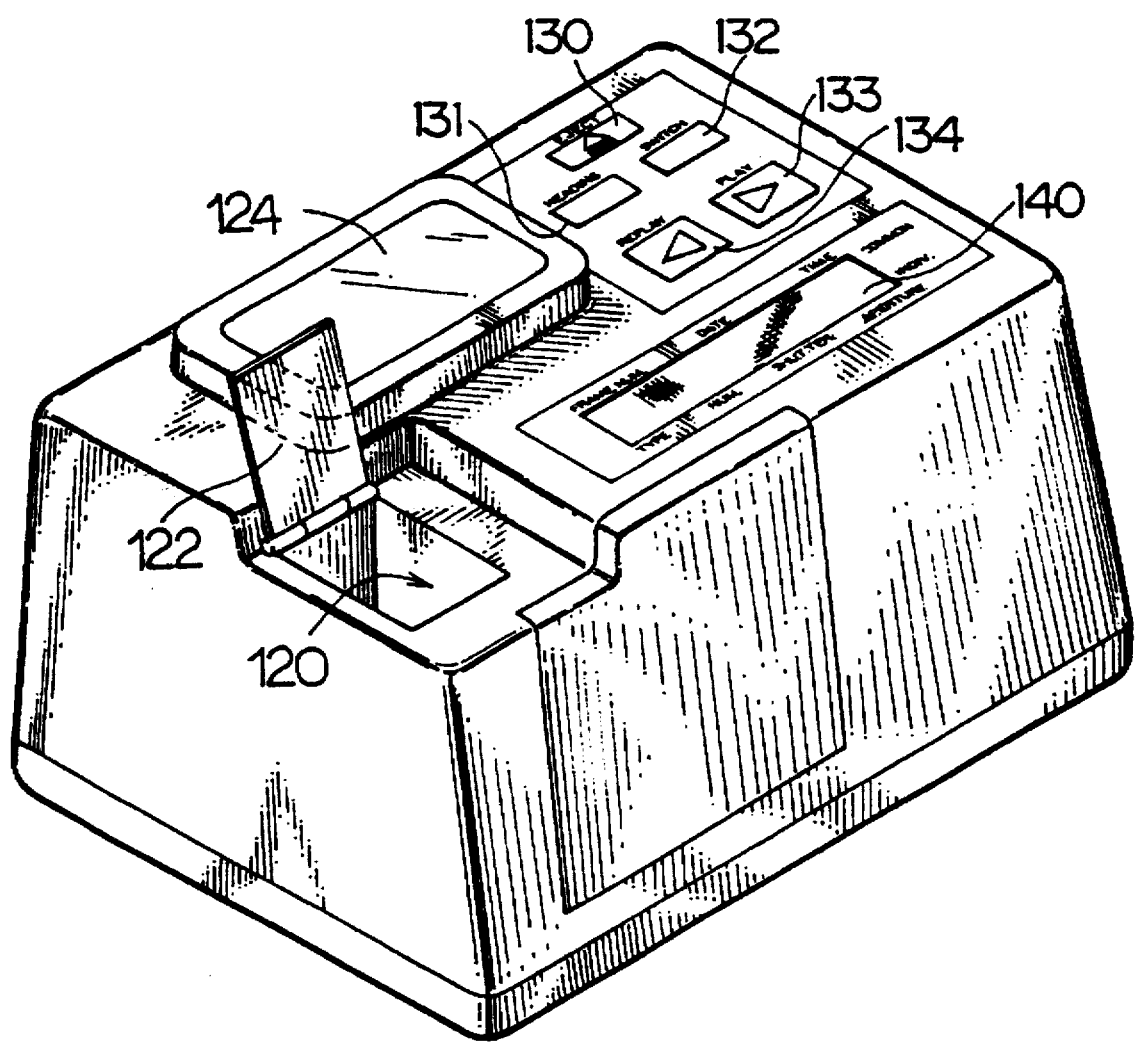
FIG. 8 is a perspective view illustrating another embodiment of the film viewer for a film having a magnetic layer according to the present invention.
Figure 9:
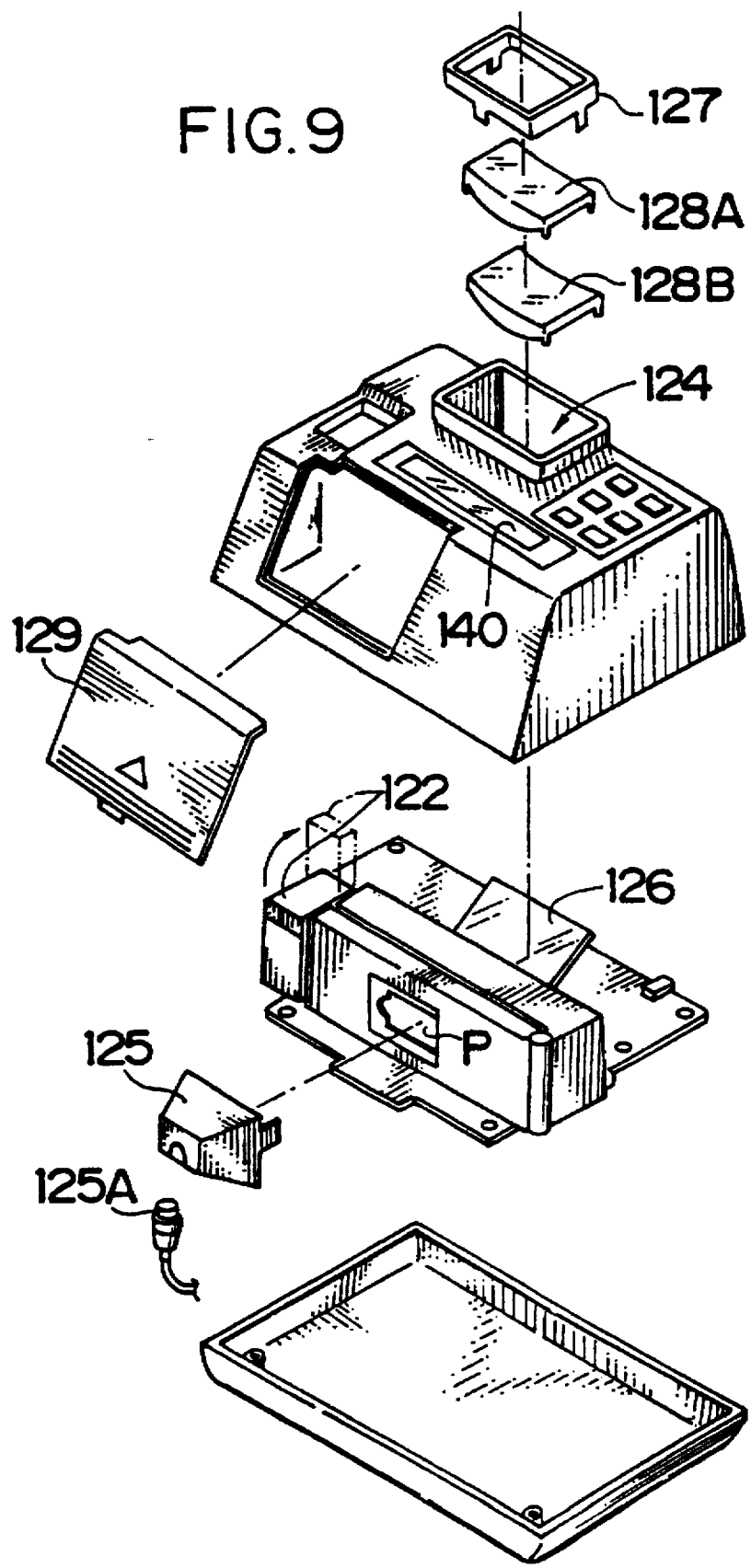
FIG. 9 is an exploded perspective view illustrating an optical system of the film viewer shown in FIG. 8.
Figure 10:
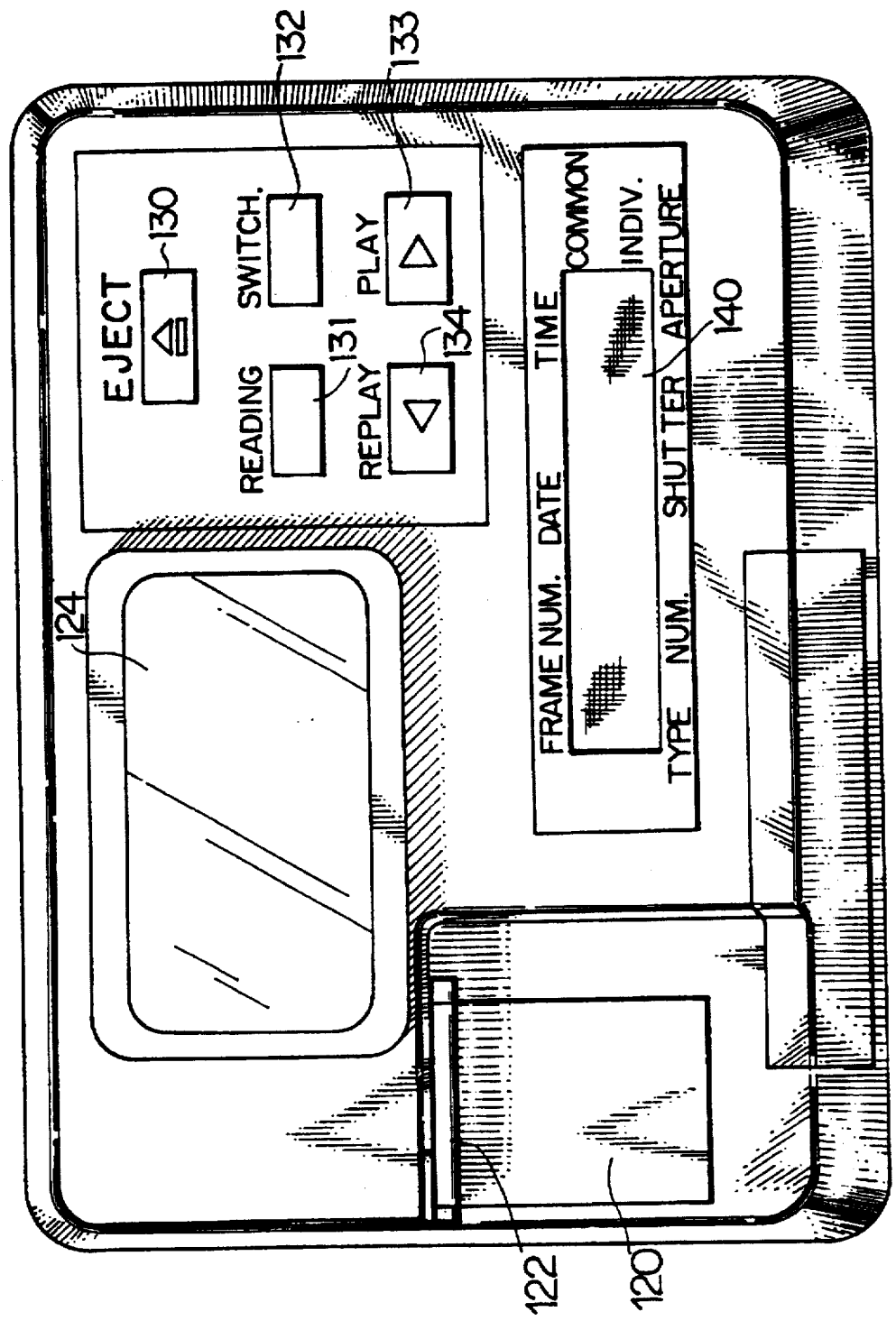
FIG. 10 is an enlarged plan view of the film viewer shown in FIG. 9.

FIG. 8 is a perspective view illustrating the other embodiment of the film viewer according to the present invention. FIG. 9 is an internal perspective diagram illustrating an optical system of the film viewer shown in FIG. 8. FIG. 10 is an enlarged plan view of the film viewer shown in FIG. 8.

As shown in these drawings, a lid 122 is provided with a storage part 120 of the film viewer. The lid 122 is opened so that the film cartridge is inserted into the storage part 120. The film cartridge pushes down a pop-up member (not shown in the drawing) of a pop-up mechanism which is provided within the storage part. When the lid 122 is closed after the insertion of the cartridge, the lid 122 is locked.

An observation window 124, a EJECT switch 130, a READING switch 131, a SWITCH 132, a Play switch 133, a REPLAY switch 134 and an LCD 140 are provided on a top surface of the film viewer. Incidentally, the film viewer has a film supply mechanism including a rotational axis which is engaged with a spool of the cartridge and driven by a motor in the storage part 120, and a film winding mechanism including a winding axis which is driven by a motor so as to wind up the film from the film supply mechanism at a position opposite to the film supply mechanism. The film supply mechanism and the film winding mechanism are constructed in the same manner as ones in FIG. 2, so a detailed explanation of them is omitted here.

FIG. 9 explains an optical system applied for the film viewer of the FIG. 8. As shown in FIG. 9, a desired frame stops at predetermined observation position P. A lamp housing part 125 is arranged in the vicinity of the observation position P. An illuminating lamp 125A is housed in the lamp housing part 125. A reaction mirror 126 is provided in such a manner to face the lamp housing part 125 across a film transport pass. Moreover, lenses 128A and 128B are supported by a lens holder 127 in the observation window 124. As a result, an image on the desired frame is illuminated by the illuminating lamp 125A. Then, an image light is reflected by the reflection mirror 126 and comes in the observation window 124 via the lenses 128A and 128B, so that the image is observed through the observation window 124. Incidentally, a lamp cover 129 is provided in the main body. The cover 129 is opened and closed so as to replace the illuminating lamp 125A.

Figure 11:
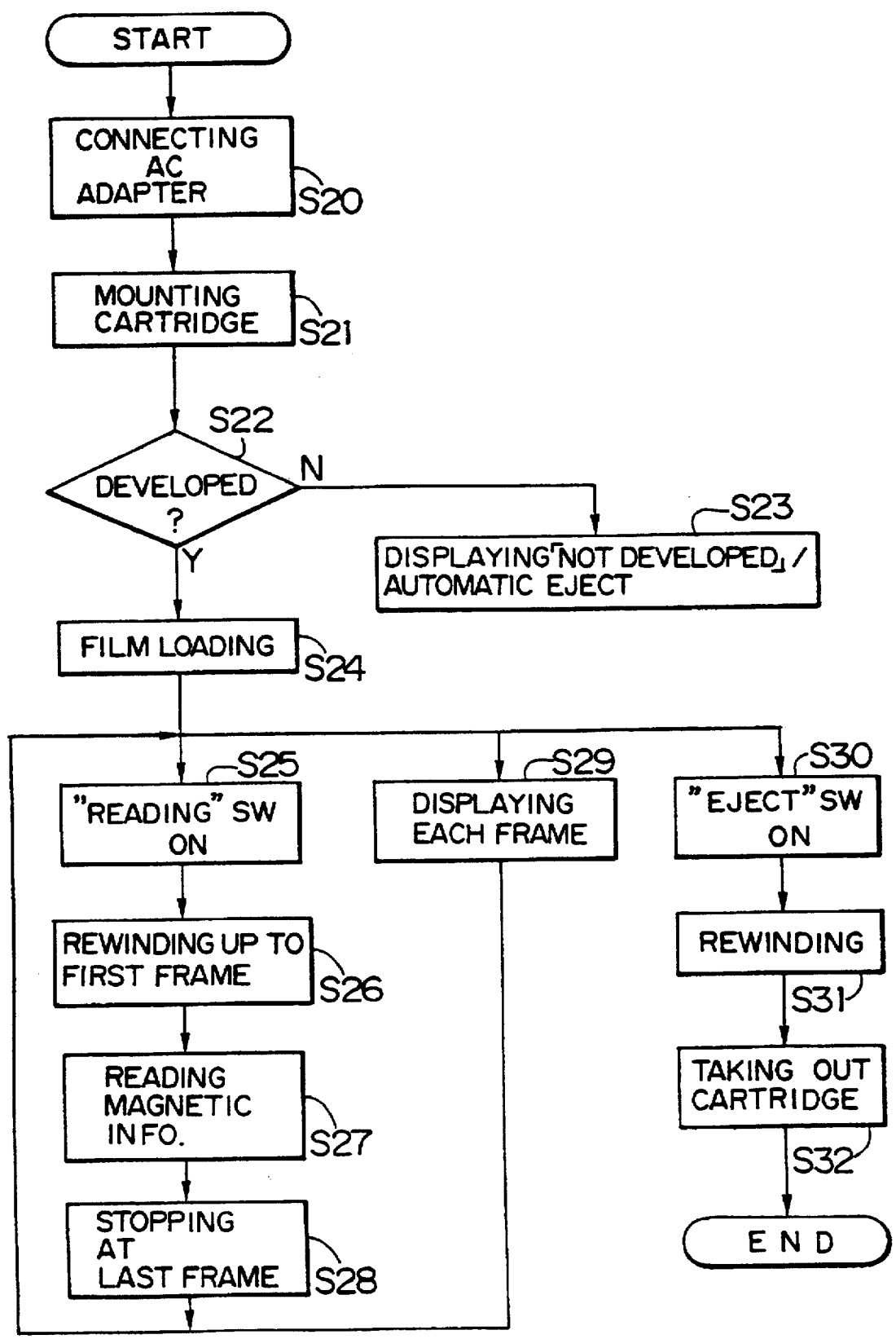
FIG. 11 is a flow chart illustrating an operation of the film viewer shown in FIG. 9.

Next, an explanation will hereunder be given of an operation of film viewer with reference to a flow chart of FIG. 11.

First, an AC adaptor is connected to the film viewer so that a electric power can be supplied to the film viewer (S20). Next, the cartridge is mounted in the storage part 120, then the lid 122 is locked (S21). At this time, it is judged whether a film in the mounted cartridge has already been developed or not in accordance with an existence of a indication piece 76 (see FIG. 3) (S22). When the indication piece 76 is not taken out, an error message indicating "NOT DEVELOPED" is displayed on the LCD 140. Then, the cartridge is automatically ejected (S23). That is, a lock of the lid 122 is released, and the cartridge is discharged by means of the pop-up mechanism.

On the other hand, when the cartridge has already been developed (the indication piece 76 is taken out), the film is pulled out from the film cartridge so that a film loading is carried out (S24). At the time of the film loading, a forward end of the film is wound around a winding axis (not shown in the drawing). When the film loading is completed, the first frame of the film positions at a observation position where a user can observe an image on the frame through the observation window 124, and a light source illuminates the image.

The user pushes down the READING switch 131 (S25). In the case that the first frame position is at the observation position, the film is sequentially transported up to the last frame and stopped (S28). In the case that the first frame is not at the observation position, the film is once rewound up to the first frame (S26) and the film is sequentially transported up to the last frame and stopped (S28). During this sequential film transport, each piece of magnetic information recorded in a magnetic layer at a forward part of the film (hereinafter referred to as a leader track) and a magnetic record layer corresponding to each frame (hereinafter referred to as a frame track) is sequentially read out, and the read-out magnetic information is stored in a RAM (S27).

Accordingly, when the reading of the magnetic information is completed, an image of the last frame can be observed through the observation window 124, and the magnetic information in the last frame is displayed on the LCD 140.

When the PLAY switch 133 or the REPLAY switch 134 is pushed down while an voluntary frame positions at the observation position, the film is transported by one frame in a forward direction or a reverse direction. As a result, the user can observe an image of the frame which is a previous frame or a following frame of the current frame through the observation window 124 (S29). Moreover, when the reading of the magnetic information is completed, the magnetic information corresponding to the frame image which is at the observation position is displayed on the LCD 140.

When the EJECT switch 130 is pushed down (S30) after the observation of the frame image, etc. is completed, the film is rewound into the film cartridge (S31). When the rewinding of the film is completed, the lock of the lid 122 is released, and the cartridge is automatically discharged from the storage part 120 by the pop-up mechanism (S32).

Incidentally, the film viewer has a power saving function. That is, when the film cartridge is mounted and the lid is closed in a state that the AC adapter is connected (the step S20) and the power source shall be supplied to the film viewer (but not supplied), or when one of the switches is pushed down in the above-mentioned state, a supply of electric power is started. After that, if the one of the switches are not operated or the lid is not opened for three (3) minutes (for example) from the start of supplying electric power, a power saving mode is set so that the light source and the power source are turned off in order to prevent the quality of the film from lowering due to the light and heat of the light source and to save the power. When one of the switches is operated in this power saving mode, the supply of electric power is started again, so that the light source illuminates.

Next, a detailed explanation will hereunder be given of each piece of magnetic information displayed on the LCD 140.

FIG. 12 is a plan view of the LCD 140 which displays a photographing condition and photographing information indicating a photographing date/time and the like. As shown in the drawing, following items are displayed on the LCD 140.

(1) Frame Number;
(2) Photographing Date;
(3) Photographing Time;
(4) Print Type;
(5) Number of Prints;
(6) Shutter Speed; and
(7) Aperture value (F-number)

(1) Display of Frame Number

On the LCD 140, a frame number of a frame being observed through the observation window 124 is displayed.

(2) Display of Photographing Date

Display modes are changed as shown in the TABLE 1 in accordance with month data (MM) of the magnetic information relating to photographing date/time.

TABLE 1

| Month Data (MM) | Display Mode |
| --- | --- |
| 1 ~ 12 | MM,DD,YY |
| 17 ~ 28 | DD,MM,YY |
| 33 ~ 44 | YY,MM,DD |
| 49 ~ 60 | ,,** |

Incidentally, in the TABLE 1, MM means a month, DD means a date, YY means a year, in which a photographing is carried out, and * * means that nothing is printed. In the case that a photographing date is 95/11/28, and the month data is 27, for example, the photographing date is displayed as "28, 11, 95". Magnetic information relating to the photographing date/time is recorded in the magnetic layer by the camera. In the case that an order of Date, Month, and Year to be printed is changed or the photographing date is not printed as shown in TABLE 1, an offset value 0, 16, 32 or 48 is added to the month data (in which photographing is carried out), so that the month data is rewritten. This rewriting of the month data is carried out by a film player, etc. which allows an order for making extra prints.

(3) Display of Photographing Time

Display modes are changed as shown in the TABLE 2 in accordance with time data (HHMM) of the magnetic information relating to photographing date/time.

TABLE 2

| Time Data (HHMM) | Display Mode |
| --- | --- |
| 00:00 ~ 23:59 | 00:00 ~ 23:59 |
| 24:00 ~ 47:59 | 00:00 ~ 23:59AM |
|  | 00:00 ~ 23:59PM |
| 48:00 ~ 71:59 | : |

In the case that display mode of the photographing time is changed or the photographing time is not printed as shown in TABLE 2, an offset value 0, 16, 32 or 48 is added to the time data (in which photographing is carried out), so that the time data is rewritten. This rewriting of the time data is carried out by a film player, etc. which allows an order for making extra prints.

(4) Display of Print Type

One of characters C, H and P is displayed disPlayed, where "C" indicates "Conventional Print", "H" indicates "High-Vision Print" and "P" indicates "Panoramic Print".

(5) Display of Number of Prints

The number of ordered prints is displayed within the range of 0–99.

(6) Display of Shutter Speed

A shutter speed corresponding to an APEX VALUE is displayed. Incidentally, displayed values and a position of a figure of each displayed value on the LCD 140 are shown in the TABLE 3.

TABLE 3

| Apex Value | Shutter Speed | LCD Display |
| --- | --- | --- |
| −10.00 | 960 | >>2 |
| : | : | .. |
| −1.25 | 2.5 | >>2 |
| −1.00 | 2 | 2 |
| : | : | . |
| 0.00 | 1 | 1 |
| : | : | . |
| 6.00 | 1/60 | 1/60 |
| : | : | .... |
| 10.00 | 1/1000 | 1/1000 |
| : | : | ...... |
| 13.25 | 1/10000 | 1/8000 |
| 13.50 | 1/12000 | <<1/8000 |
| : | : | ....... |
| 14.75 | 1/25600 | <<1/8000 |

(7) Diplay of F-Number

F-Number corresponding to Apex Value is displayed. Incidentally, displayed values and a position of a figure of each displayed value on the LCD 140 are shown in the TABLE 4.

TABLE 4

| Apex Value | F-Number | Display Contents |
| --- | --- | --- |
| −2 | 0.50 | <<1.4 |
| : | : | .... |
| 0.75 | 1.3 | <<1.4 |
| 1 | 1.4 | 1.4 |
| : | : | ... |
| 4 | 4.0 | 4.0 |
| : | : | ... |
| 7.3 | 13.0 | 13 |
| 7.5 | 13.5 | 13.5 |
| 7.8 | 14.0 | 14 |
| : | : | .. |
| 9.0 | 22.0 | 22 |
| 9.3 | 25.0 | >>22 |
| : | : | ... |
| 13.0 | 90.0 | >>22 |

Incidentally, the user can designate to print the photographing date and the photographing time on front of a pant or a backing paper (front print or back print). In the case that only the back print is designated, letter "B" is displayed in front of the photographing date on the LCD 140. In the case that both of the front print and the back print are designated, letter "&" is displayed in front of the photographing date on the LCD 140 (refer to FIG. 12). In the case that both of the front print and the back print are not designated, "*" is displayed on the LCD 140 as showing TABLE 1 and TABLE 2.

On the other hand, if the SWITCH 132 is pushed down when each of the above-mentioned pieces of photographing information is displayed on the LCD 140, displayed contents on the LCD 140 is changed to a title information such as the film title and the frame title. There are two kinds of titles, that is, a free title, which is appropriately selected from a character selection code by the user, and a selected title which is selected from a selected title list. Moreover, these titles are classified into a roll title, which is recorded in the leader track of the film and is common to all frames, and an individual frame title for each frame, which is recorded in the frame track corresponding to each frame.

When the title information read-out from the leader/frame track indicates the free title, letter "F" indicating the free title is displayed as shown in FIG. 13 (A). When the title information indicates the selected title, letter "S" indicating the selected title is displayed as shown in FIG. 13 (B). The roll title is displayed on the upper section on the LCD 140, and the frame title is displayed on the lower section on the LCD 140. Incidentally, the number of displayed characters is within eighteen (18), and nineteen (19) characters or more are scrolled to be displayed. When back print of the title is designated, "F :" is displayed. When there is no designation, "F *" is displayed. Furthermore, the information relating to the selected title consists of a language code "L-◯◯" such as Japanese, English, etc., and a title code "T-◯◯" such as Christmas, Birthday, etc.. A character corresponding to the language code and the title code or the code itself "L-◯◯ T-◯◯" is displayed.

Next, an explanation will hereunder be given of the other display examples on the LCD 140. In the case that the READING switch 131 is not operated and the magnetic information is not read out, only the current frame number is displayed on the LCD 140. In this case, the display changeover by an operation of the SWITCH 132 is not carried out.

Figure 15:
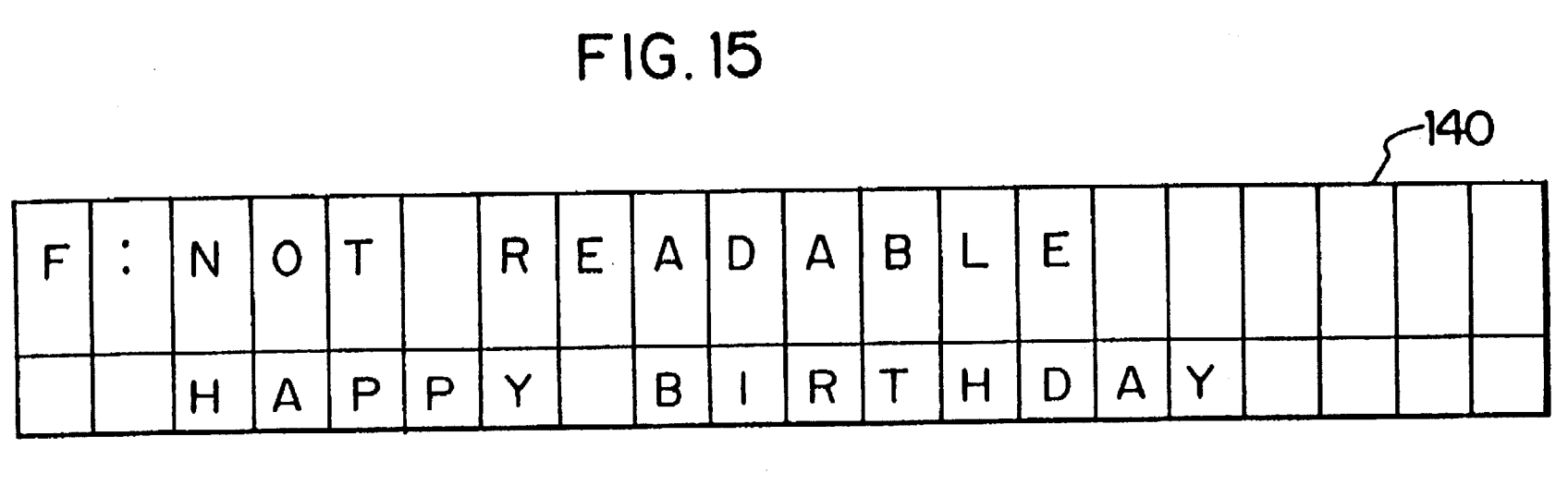

On the other hand, in the case that the magnetic information has been read out, but there is an error in the magnetic information of a certain frame, "- -" is displayed at the time of displaying the photographing information as shown in FIG. 14(A) and "NOT READABLE" is displayed on a position for the frame title as shown in FIG. 14(B). When there is an error in the roll title which is read out from the leader track, "NOT READABLE" is displayed at a position for the roll title as shown in FIG. 15. Furthermore, when the undeveloped cartridge is inserted, "NOT DEVELOPED" is displayed as shown in FIG. 16. When there is something wrong with the film transportation, etc., "TRANSPORT ERROR" is displayed as shown in FIG. 17.

As has been described above, according to the film viewer of the present invention, an image of the film can be easily observed through the observation window. Moreover, the magnetic information recorded in the magnetic record layer of the film is read and the readout magnetic information is displayed on a display means such as a LCD, etc. in accordance with an image being observed. Therefore it is possible to observe the magnetic information recorded in accordance with each frame.

It should be understood, however, that there is no intention to limit the invention to the specific forms disclosed, but on the contrary, the invention is to cover all modifications, alternate constructions and equivalents falling within the spirit and scope of the invention as expressed in the appended claims.

I claim:

1. A film viewer for a film having a plurality of frames and a magnetic layer, the film viewer comprising:

a storage part for storing a film cartridge;

film supplying means, including a rotational axis engaged with a spool of the film cartridge and rotated by a motor for supplying the film;

film winding means, including a winding axis rotated by a motor, for winding the film;

a window used to observe an image of a frame of the film positioned between the film supplying means and the film winding means;

frame detection means for detecting a frame of the film and for generating a detection signal;

reading means for reading out magnetic information recorded in the magnetic layer of the film;

display means for displaying the read-out magnetic information; and control means for controlling at least one of the film supplying means and the film winding means to transport the film such that an image of a detected frame is observed through the window in accordance with the detection signal of the frame detection means, and for controlling the display means to display the magnetic information corresponding to the film image to be observed through the window.

2. A film viewer for a film having a plurality of frames and a magnetic layer according to claim 1, further comprising:

detecting means for detecting whether the film has been developed or not, wherein the control means controls at least one of the film supplying means and the film winding means to carry out film loading when the detecting means detects that the film has been developed, the film being pulled out from a film cartridge and a forward end of the film being wound around the winding axis of the film winding means at the time of the film loading.

3. A film viewer for a film having a plurality of frames and a magnetic layer according to claim 1, further comprising:

detecting means for detecting whether the film has been developed or not; and discharging means for automatically discharging the film cartridge from the storage part, wherein the control means controls the discharging means to discharge the film cartridge from the storage part when the detecting means detects that the film has not been developed.

4. A film viewer for a film having a plurality of frames and a magnetic layer according to claim 1, wherein the film cartridge includes an indicating means indicating whether the film has been developed or not, further comprising:

preventing means for detecting the indicating means of the film cartridge and for preventing the film cartridge from being mounted in the storage part when the indicating means indicates that the film has not been developed.

5. A film viewer for a film having a plurality of frames and a magnetic layer according to claim 1, wherein optical information is recorded for a frame of the film, and the optical information is observed through the window.

6. A film viewer for a film having a plurality of frames and a magnetic layer according to claim 1, further comprising:

first switch for instructing transporting of the film by one frame in a forward direction; and a second switch for instructing transporting of the film by one frame in a reverse direction, wherein the control means controls one of the film supplying means and the film winding means to transport the film by one frame from the frame observed through the window in a respective one of the forward direction and the reverse direction when a respective one of the first switch and the second switch is operated.

7. A film viewer for a film having a plurality of frames and a magnetic layer according to claim 1, further comprising:

a switch for instructing the reading out the magnetic information from the magnetic layer of the film, wherein the control means controls the film supplying means, the film winding means and the reading means to rewind the film up to a forward part and to sequentially transport the film up to a last frame in the forward direction so that the magnetic information is read out from the magnetic layer when the switch is operated.

8. A film viewer for a film having a plurality of frames and a magnetic layer according to claim 1, further comprising:

a switch for instructing a changeover between photographing information indicating at least one of a photographing condition for each frame and a photographing date/time for each frame, and title information for each frame, wherein the control means controls the display means to selectively display one of the photographing information corresponding to an image being observed through the window and the title information corresponding to the image being observed through the window when the switch is operated.

* * * * *